United States Patent
Kim et al.

(10) Patent No.: US 7,528,774 B2
(45) Date of Patent: May 5, 2009

(54) APPARATUS FOR MEASURING AZIMUTH BY USING PHASE DIFFERENCE AND METHOD OF USING THE SAME

(75) Inventors: Wan Jin Kim, Yongin-si (KR); Min Seop Jeong, Yongin-si (KR); Jung Eun Lee, Yongin-si (KR); Hee Mun Bang, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 115 days.

(21) Appl. No.: 11/703,201

(22) Filed: Feb. 7, 2007

(65) Prior Publication Data

US 2008/0018536 A1     Jan. 24, 2008

(30) Foreign Application Priority Data

Jul. 18, 2006   (KR) ................. 10-2006-0066704

(51) Int. Cl.
    *G01S 1/38*    (2006.01)
(52) U.S. Cl. ........................ 342/417; 342/442
(58) Field of Classification Search ........... 342/442, 342/417, 464; 324/76.52, 76.54, 76.55; 327/3
    See application file for complete search history.

(56) References Cited

U.S. PATENT DOCUMENTS

| | | | |
|---|---|---|---|
| 5,189,420 A * | 2/1993 | Eddy et al. ................ 341/157 |
| 6,577,273 B2 * | 6/2003 | Hamada et al. ............. 342/442 |
| 6,590,535 B1 | 7/2003 | De Champlain et al. | |
| 2002/0118132 A1 | 8/2002 | Richards et al. | |
| 2005/0225476 A1 | 10/2005 | Hoetzel et al. | |

FOREIGN PATENT DOCUMENTS

| | | |
|---|---|---|
| JP | 05-037378 A | 2/1993 |
| JP | 07-174840 A | 7/1995 |
| JP | 2001-183458 A | 7/2001 |
| KR | 1999-0078194 A | 10/1999 |
| KR | 10-2003-0013417 A | 2/2003 |
| KR | 10-2004-0018371 A | 3/2004 |
| KR | 10-2005-0004222 A | 1/2005 |
| KR | 10-2005-0060531 A | 6/2005 |

* cited by examiner

*Primary Examiner*—Gregory C Issing
(74) *Attorney, Agent, or Firm*—Sughrue Mion, PLLC

(57) ABSTRACT

An azimuth measurement apparatus including: a positioning signal receiver receiving a first impulse positioning signal and a second impulse positioning signal from a first fixed position and a second fixed position, respectively; a phase difference detector detecting a phase difference between the first impulse positioning signal and the second impulse positioning signal; and an azimuth calculator measuring an azimuth of an object of positioning, based on the detected phase difference of the two positioning signals.

20 Claims, 15 Drawing Sheets

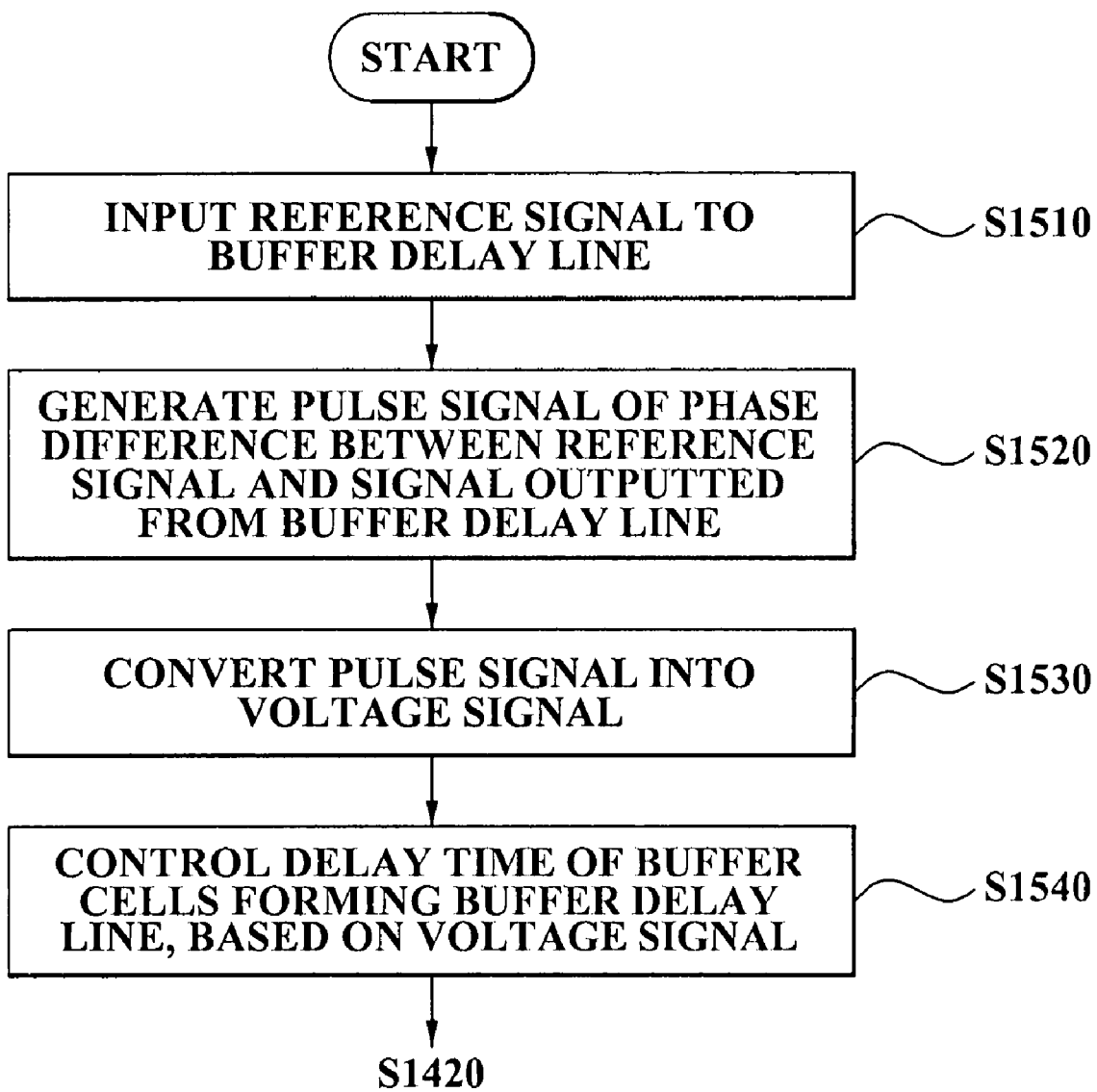

APPARATUS FOR MEASURING AZIMUTH BY USING PHASE DIFFERENCE AND METHOD OF USING THE SAME

CROSS-REFERENCE TO RELATED APPLICATIONS

This application claims priority from Korean Patent Application No. 10-2006-0066704, filed on Jul. 18, 2006 in the Korean Intellectual Property Office, the disclosure of which is incorporated herein by reference.

BACKGROUND OF THE INVENTION

1. Field of the Invention

Methods and apparatuses consistent with the present invention relate to measuring azimuth, and more particularly, to an azimuth measurement apparatus and method using a phase difference, capable of measuring a precise position of an object by reducing an error of an azimuth using a phase difference between impulse signals received at an indoor positioning field.

2. Description of the Related Art

FIG. 1 is a diagram illustrating conventional measurement method of a position of an object 110, used in an indoor positioning field to ascertain the position of the object 110 at the object 110 itself, or at a base station BS1 or BS2. Referring to FIG. 1, to measure the position of the object 110, a distance d1 between the object 110 and the base station BS1, a distance d2 between the object 110 and the base station BS2, and an azimuth θ of the object 110 have to be known.

Namely, the position of the object 110 may be known by using a distance d between a fixed position and the object 110, and the azimuth θ, wherein the fixed position is located between the base stations BS1 and BS2 separated from each other by a distance L. Conventionally, the distance d between the fixed position and the object 110, and the azimuth θ are measured by using the distance d1 between the object 110 and the base station BS1, and the distance d2 between the object 110 and the base station BS2.

In this case, the azimuth θ of the object 110 is calculated by using a difference between the object 110 and each of the distances d1 and d2. Accordingly, the precise position of the object 110 may be known by reducing an error in the azimuth θ by precisely measuring the difference between the object 110 and each of the distances d1 and d2.

However, as shown in FIG. 1, since there is an error range of the object 110, the azimuth θ cannot be precisely measured by using the difference between the distances d1 and d2, thereby increasing an error in measuring the position of the object 110. Accordingly, an apparatus and method capable of measuring a precise position of an object by reducing an error of an azimuth using a phase difference is required.

SUMMARY OF THE INVENTION

An aspect of the present invention provides an azimuth measurement apparatus and method using a phase difference, detecting the phase difference by receiving two impulse positioning signals from two fixed positions, respectively, and measuring a precise azimuth of an object by using the detected phase difference.

An aspect of the present invention also provides an azimuth measurement apparatus and method of measuring a precise azimuth by detecting a precise phase difference between two impulse positioning signals.

An aspect of the present invention also provides an azimuth measurement apparatus and method of detecting a precise position of an indoor object by measuring a precise azimuth.

An aspect of the present invention also provides an azimuth measurement apparatus and method of reducing an error of a position of an object by reducing an error in measuring an azimuth of an object.

According to an aspect of the present invention, there is provided an azimuth measurement apparatus including: a positioning signal receiver receiving a first impulse positioning signal and a second impulse positioning signal from a first fixed position and a second fixed position, respectively; a phase difference detector detecting a phase difference between the first impulse positioning signal and the second impulse positioning signal; and an azimuth calculator measuring an azimuth of an object of positioning, based on the detected phase difference of the two positioning signals.

The phase difference detector may detect the phase difference between the first impulse positioning signal and the second impulse positioning signal; and may digitize and output the detected phase difference to the azimuth calculator.

The phase difference detector may include: a positioning signal phase detection unit receiving the first impulse positioning signal and the second impulse positioning signal and outputting a pulse signal with respect to the phase difference of the two positioning signal; a pulse-voltage conversion unit converting the pulse signal into a voltage signal; and an analogue-digital (A/C) conversion unit digitizing and outputting the voltage signal to the azimuth calculator.

The phase difference detector may include: a buffer delay line unit formed of a plurality of buffer cells, connected in series, generating a delay signal of the first impulse positioning signal; and a phase offset detection unit detecting, digitizing, and outputting the phase difference between the first impulse positioning signal and the second impulse positioning signal based on a plurality of the delay signals generated by the buffer delay line unit and the second impulse positioning signal, to the azimuth calculator.

The phase difference detector may include: a buffer delay line unit formed of a plurality of buffer cells whose delay time is controlled by a magnitude of a control voltage; a phase delay time control unit determining the magnitude of the control voltage based on a predetermined reference signal and an input of the reference signal, passing through the buffer delay line unit; and a phase offset detection unit detecting, digitizing, and outputting the phase difference between the first impulse positioning signal and the second impulse positioning signal based on an output of each buffer cell forming the buffer delay line unit with respect to the first impulse positioning signal and the second impulse positioning signal, to the azimuth calculator.

The buffer delay line unit may delay the reference signal by half-period multiples of the reference signal.

The phase delay time control unit may include: a phase delay detection part receiving the predetermined reference signal, passing the reference signal through the buffer delay line unit, and outputting a pulse signal with respect to a phase difference between the two signals; a pulse-voltage conversion part converting the pulse signal into a voltage signal; and a voltage control part determining a magnitude of the control voltage based on the voltage signal.

According to another aspect of the present invention, there is provided an azimuth measurement method including: receiving a first impulse positioning signal and a second impulse positioning signal from a first fixed position and a second fixed position, respectively; detecting a phase difference between the first impulse positioning signal and the second impulse positioning signal; and measuring an azimuth of an object of positioning, based on the detected phase difference.

The detecting a phase difference may include: detecting the phase difference between the first impulse positioning signal and the second impulse positioning signal; and digitizing and outputting the detected phase difference to the azimuth calculator.

The detecting a phase difference may include: receiving the first impulse positioning signal and the second impulse positioning signal and outputting a pulse signal with respect to the phase difference of the two positioning signal; converting the pulse signal into a voltage signal; and digitizing the voltage signal.

The detecting a phase difference may include: generating a plurality of delay signals of the first impulse positioning signal; detecting the phase difference between the first impulse positioning signal and the second impulse positioning signal based on the plurality of delay signals of the first impulse positioning signal and the second impulse positioning signal; and digitizing the detected phase difference.

The detecting a phase difference may include: controlling a variance of the buffer delay line formed of the plurality of buffer cells; inputting the first impulse positioning signal to the buffer delay line whose variance is controlled; and detecting a phase difference between an output of each buffer cell of the buffer delay line with respect to the first impulse positioning signal and the second impulse positioning signal based on the two signals.

The controlling a variance of the buffer delay line may include: inputting a predetermined reference signal to the buffer delay line; outputting a pulse signal with respect to a phase difference between a signal generated from the reference signal via the buffer delay line and the predetermined reference signal; converting the pulse signal into a voltage signal; and controlling a delay time of the buffer cells forming the buffer delay line based on the voltage signal.

In the controlling a variance of the buffer delay line, the variance of the buffer delay line is controlled until there is no phase difference between the signal outputted via the buffer delay line and the predetermined reference signal.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 15 is a flowchart illustrating in detail operation S1410 shown in FIG. 14.

DETAILED DESCRIPTION OF EXEMPLARY EMBODIMENTS

Figure 1:
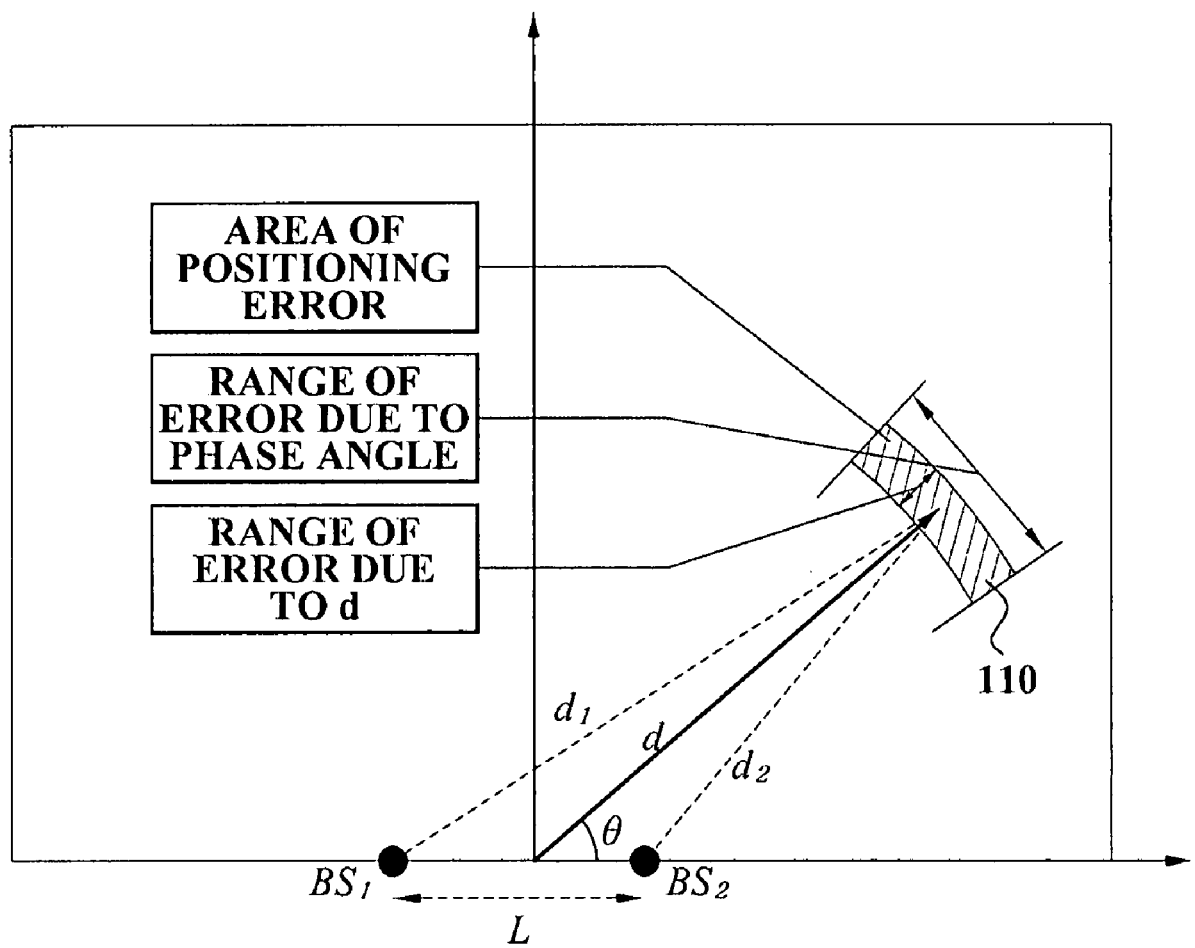
FIG. 1 is a diagram illustrating a conventional measurement method of a position of an object, used in an indoor positioning field.

Reference will now be made in detail to the exemplary embodiments of the present invention, examples of which are illustrated in the accompanying drawings, wherein like reference numerals refer to the like elements throughout. The exemplary embodiments are described below to explain the present invention by referring to the figures.

Figure 2:
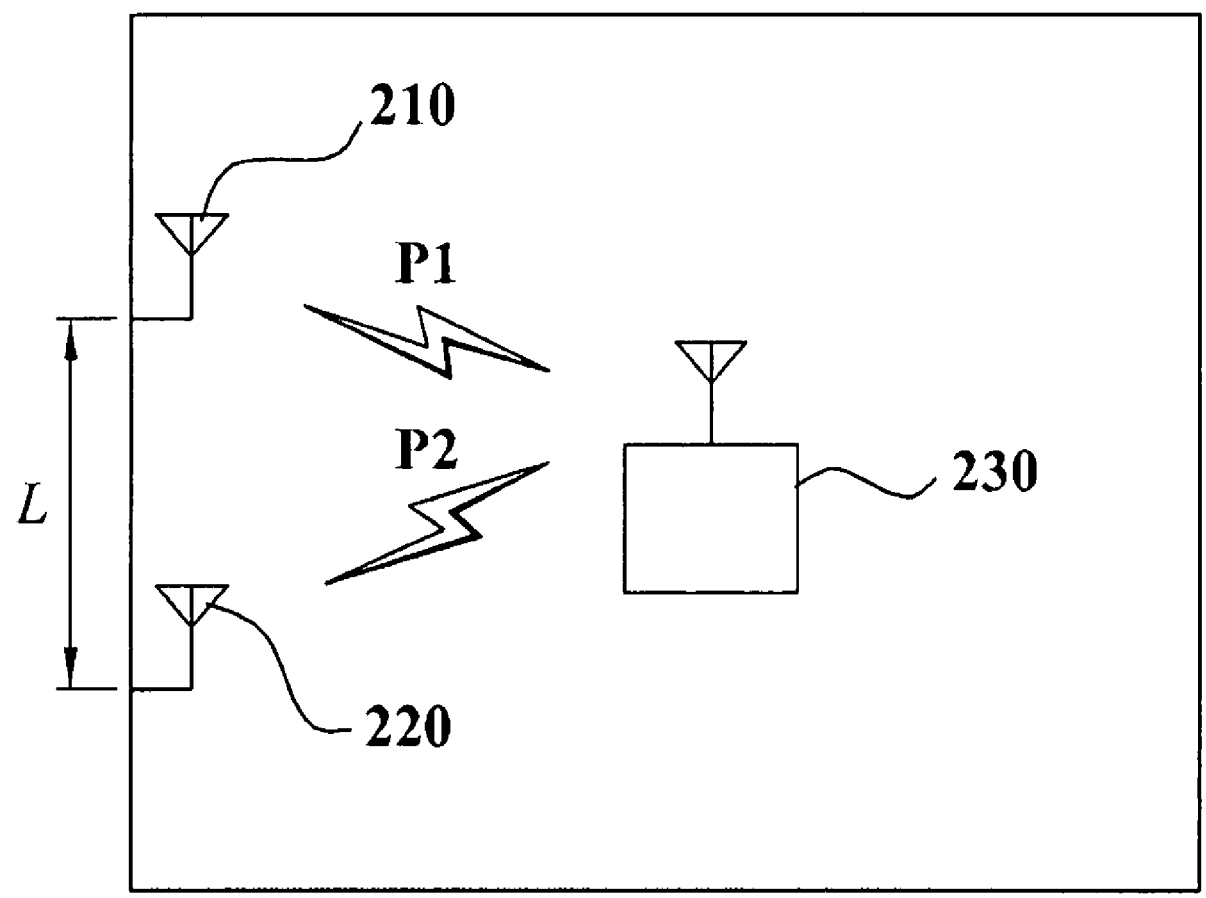
FIG. 2 is a system configuration diagram illustrating an azimuth measurement apparatus according to an exemplary embodiment of the present invention.

FIG. 2 is a system configuration diagram illustrating an azimuth measurement apparatus according to an exemplary embodiment of the present invention. Referring to FIG. 2, a first base station (hereinafter, referred to as a first position) 210 and a second base station (hereinafter, referred to as a second position) 220, fixed at each position, and an object 230 are illustrated.

In this case, the first position 210 and the second position 220 are fixed, respectively, and a distance between the two positions is L. The first position 210 transmits a first impulse positioning signal P1 to the object 230, and the second position 220 transmits a second impulse positioning signal P2 to the object 230. The object 230 receives the first impulse positioning signal P1 and the second impulse positioning signal P2 and measures an azimuth of the object 230 by using the azimuth measurement apparatus according to an exemplary embodiment of the present invention.

Figure 3:
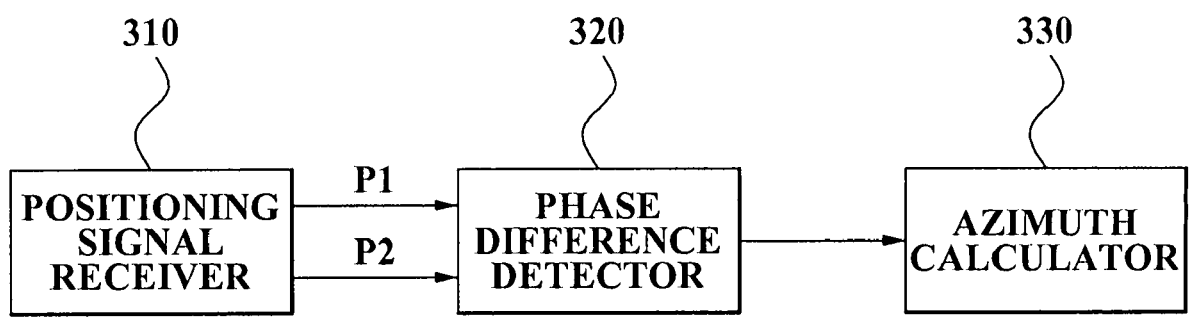
FIG. 3 is a block diagram illustrating a configuration of the azimuth measurement apparatus using a phase difference, according to an exemplary embodiment of the present invention.

FIG. 3 is a block diagram illustrating a configuration of the azimuth measurement apparatus using a phase difference, according to an exemplary embodiment of the present invention. Referring to FIG. 3, the azimuth measurement apparatus according to an exemplary embodiment of the present invention includes a positioning signal receiver 310, a phase difference detector 320, and an azimuth calculator 330.

The positioning signal receiver 310 receives the first impulse positioning signal P1 and the second impulse positioning signal P2 from the first position and the second position, respectively. In this case, the first impulse positioning signal P1 and the second impulse positioning signal P2 are transmitted at a predetermined interval in time, and the object 230 has recognized the predetermined interval in time between the two impulse positioning signals. Accordingly, the positioning signal receiver 310 receives the first impulse positioning signal P1 and the second impulse positioning signal P2, transmitted at the predetermined interval in time, and outputs the two impulse positioning signals P1 and P2 by removing the predetermined interval in time.

The phase difference detector 320 detects a phase difference between the first impulse positioning signal P1 and the second impulse positioning signal P2, received by the positioning signal receiver 310. Namely, a delay time of the two impulse positioning signals P1 and P2 inputted to the phase difference detector 320 is detected. The detected phase difference may be digitized and outputted.

The azimuth calculator 330 calculates an azimuth of the object 230 by using the phase difference between the two impulse positioning signals P1 and P2, detected at the phase difference detector 320. In this case, the azimuth is calculated as shown in Equation 1.

$$\theta = \cos^{-1}(\Delta d/L)$$ [Equation 1]

In this case, θ indicates the azimuth of the object 230, L indicates the distance between the first position 210 and the second position 220 shown in FIG. 2, and Δd indicates a difference d1−d2 between the distances d1 and d2, where d1 is the distance between the first position 210 and the object 230 and d2 is the distance between the second position 220 and the object 230.

Thus, according to the present invention, Δd is precisely measured by using the phase difference between the two impulse positioning signals P1 and P2 instead of the distances d1 and d2.

In this case, Δd is acquired as shown in Equation 2.

$$\Delta d = c \cdot \Delta \tau$$ [Equation 2]

In this case, c indicates the speed of light and Δτ indicates a phase difference time of the two impulse positioning signals P1 and P2. Namely, when the phase difference between the two impulse positioning signals is detected, Δd may be acquired by Equation 2 and the azimuth of the object 230 may be calculated by Equation 1.

Figure 4:
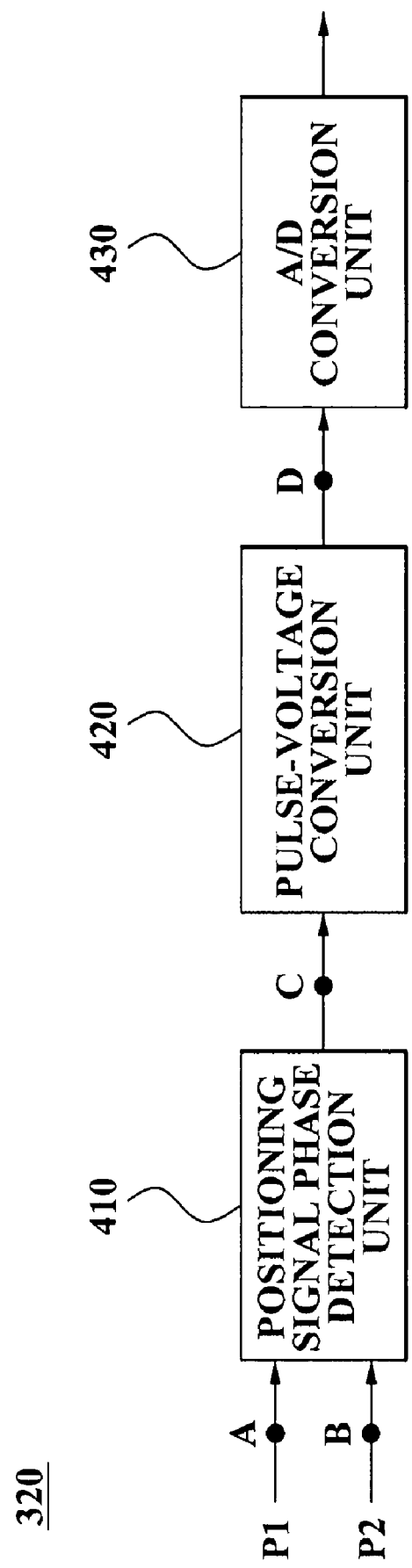
FIG. 4 is a block diagram illustrating a configuration of a phase difference detector shown in FIG. 3.

FIG. 4 is a block diagram illustrating a configuration of the phase difference detector 320 shown in FIG. 3. Referring to FIG. 4, the phase difference detector 320 includes a positioning signal phase detection unit 410, a pulse-voltage conversion unit 420, and an analogue-digital (A/D) conversion unit 430.

The positioning signal phase detection unit 410 outputs a pulse signal of the phase difference between the first impulse positioning signal P1 and the second impulse positioning signal P2. The pulse-voltage conversion unit 420 converts the pulse signal of the phase difference, outputted from the positioning signal phase detection unit 410, into a voltage signal. The A/D conversion unit 430 digitizes and outputs the voltage signal converted from the pulse signal of the phase difference, to the azimuth calculator 330.

Figure 5:
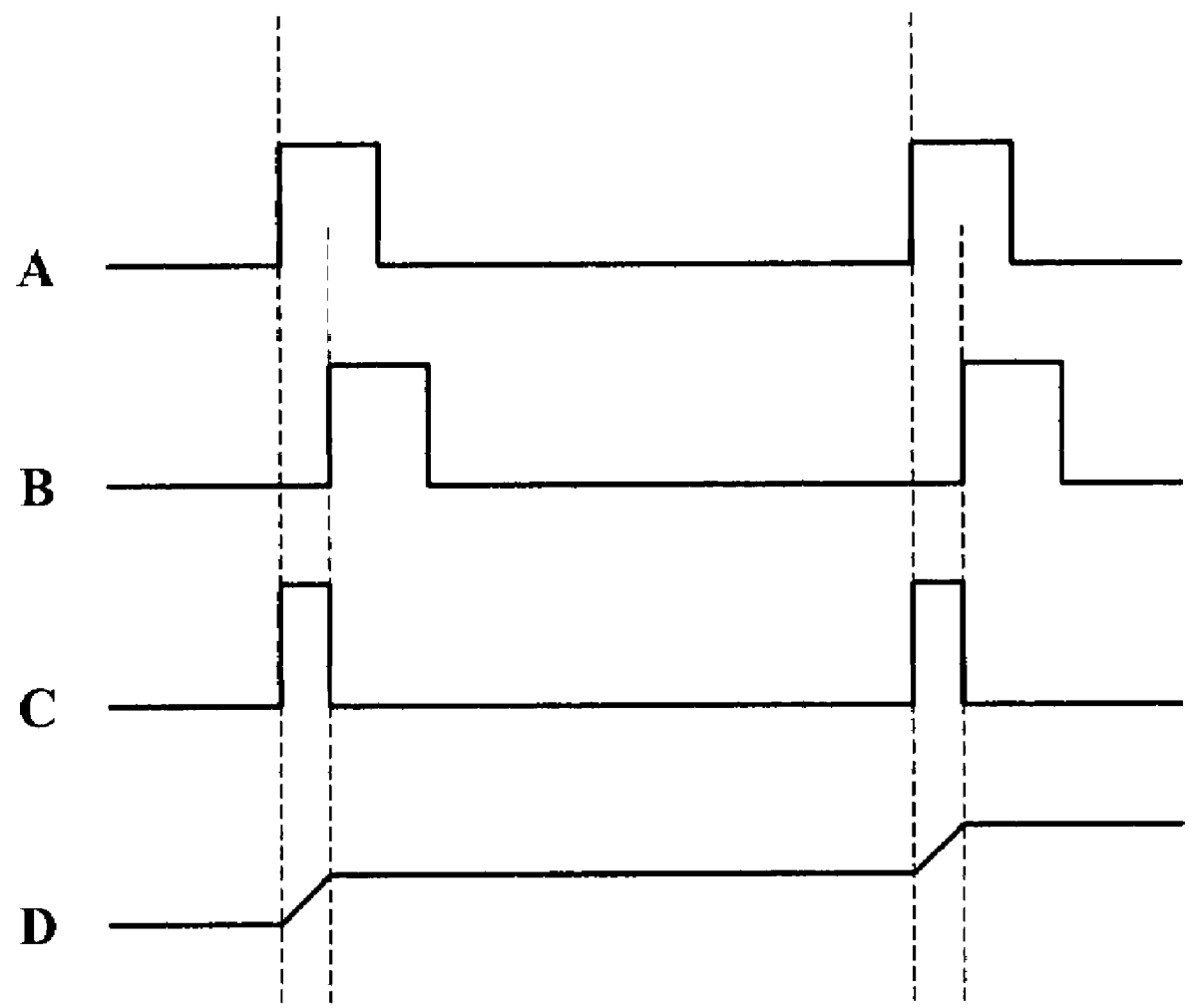
FIG. 5 is a diagram illustrating a waveform of each of parts A through D shown in FIG. 4.

The operations illustrated in FIG. 4 will be described in detail by referring to FIG. 5. FIG. 5 is a diagram illustrating a waveform of each of parts A through D shown in FIG. 4.

Referring to FIG. 5, when the first impulse positioning signal P1 and the second impulse positioning signal P2 are inputted, namely, a waveform of A and a waveform of B are inputted, the positioning signal phase detection unit 410 outputs a waveform of C that is the pulse signal of the phase difference between the two impulse positioning signals P1 and P2.

When the pulse signal of the phase difference between the two impulse positioning signals is outputted, the pulse-voltage conversion unit 420 converts the waveform of C that is the pulse signal, into a voltage signal to digitize. Specifically, after converting the waveform of C into a waveform of D, the A/D conversion unit 430 digitizes and outputs the waveform of D to the azimuth calculator 330.

Figure 6:
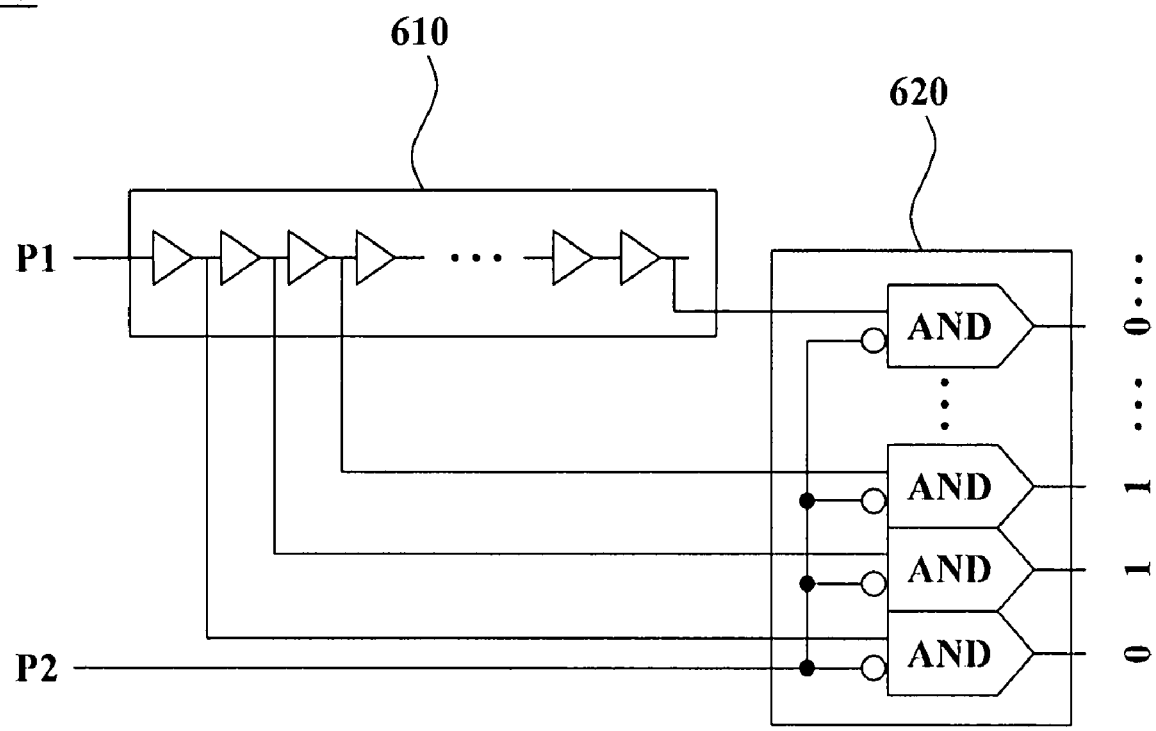
FIG. 6 is a block diagram illustrating a configuration of the phase difference detector shown in FIG. 3, according to another embodiment of the present invention.

FIG. 6 is a block diagram illustrating a configuration of the phase difference detector 320 shown in FIG. 3, according to another exemplary embodiment of the present invention. Referring to FIG. 6, the phase difference detector 320 includes a buffer delay line unit 610 and a phase offset detection unit 620.

The buffer delay line unit 610 includes a plurality of buffer cells connected in series. The buffer delay line unit 610 receives the first impulse positioning signal P1 and outputs the first impulse positioning signal P1 delayed by a predetermined amount of time at each of the buffer cells.

The phase offset detection unit 620 receives a plurality of delayed first impulse positioning signals outputted from the buffer delay line unit 610 and the second impulse positioning signal P2 and outputs a value of the digitized phase difference between the two impulse positioning signals P1 and P2, to the azimuth calculator 330. In this case, the phase offset detection unit 620 includes a plurality of AND gate circuits, and the second impulse positioning signal P2 is inputted to each of the AND gate circuits via an inverter. The operations illustrated in FIG. 6 will be described in detail by referring to FIG. 7.

Figure 7:
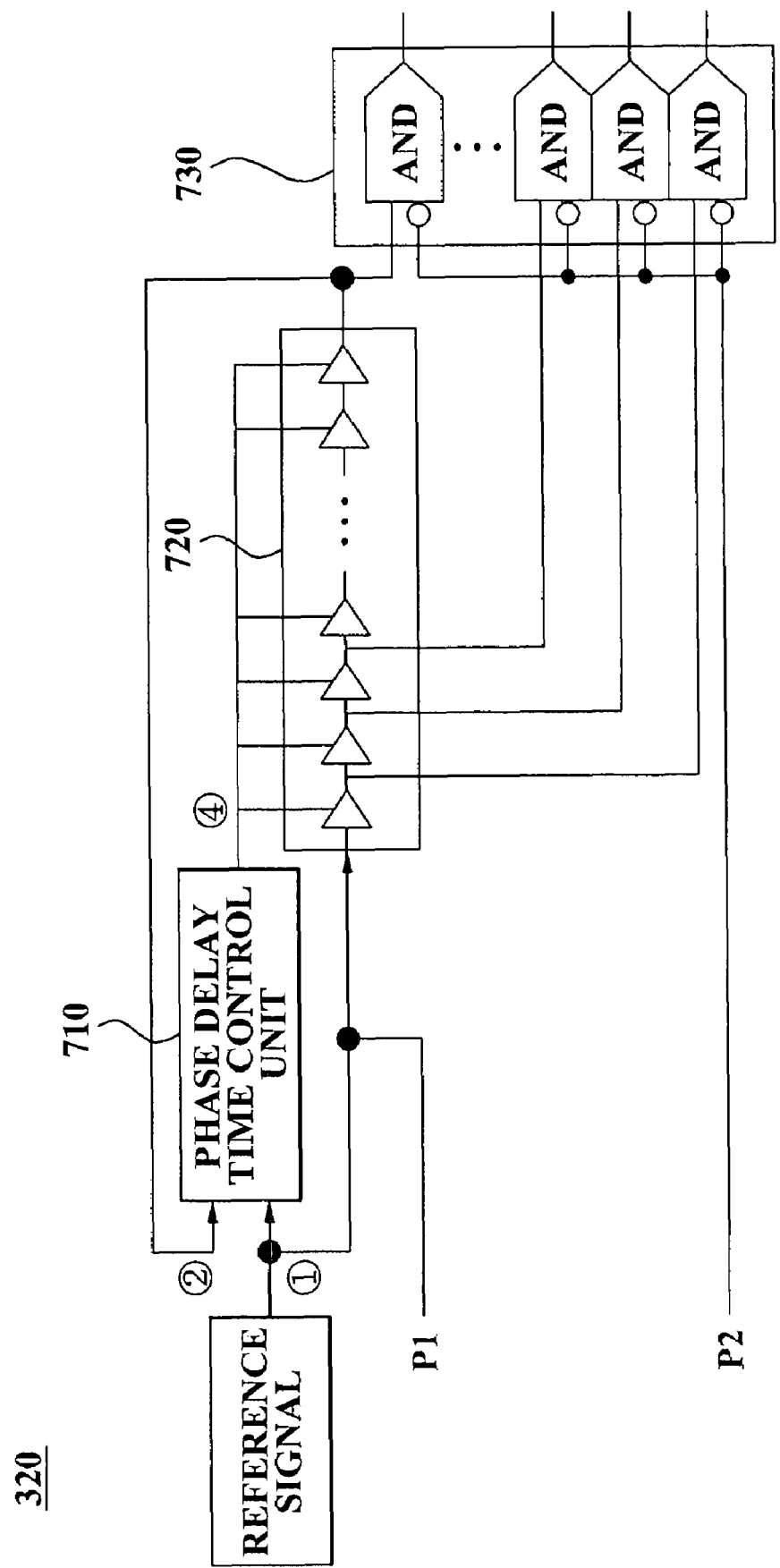
FIG. 7 is a block diagram illustrating a configuration of the phase difference detector shown in FIG. 3, according to still another embodiment of the present invention.

FIG. 7 is a block diagram illustrating a configuration of the phase difference detector 320 shown in FIG. 3, according to still another exemplary embodiment of the present invention. It may be known that a phase delay time control unit is added to the configuration shown in FIG. 6. Namely, FIG. 7 is a block diagram illustrating a configuration capable of reducing a variance that may occur due to a delay and operation temperature of buffer cells forming a buffer delay line unit 720. Referring to FIG. 7, the phase difference detector 320 includes a phase delay time control unit 710, the buffer delay line unit 720, and a phase offset detection unit 730.

The buffer delay line unit 720 includes a plurality of buffer cells connected in series, and a delay time of the buffer cells is controlled by a control voltage inputted from outside. Namely, since a phase delay time of the buffer cell is controlled depending on a magnitude of the voltage inputted from the phase delay time control unit 710, a total delay time of the buffer delay line unit 720 may be controlled. In this case, the delay time of the buffer delay line unit 720 is delayed by half-period multiples of a period T, i.e. T/2, T, 3T/2, ... of a reference signal inputted to the buffer delay line unit 720. In this case, the reference signal may be inputted by a reference signal generation apparatus while the period of the reference signal is predetermined.

The phase delay time control unit 710 receives the reference signal and a signal made from the reference signal passing through the buffer delay line unit 720 and outputs the control voltage controlling the delay time of the buffer cells forming the buffer delay line unit 720, depending on a phase difference between the two signals. In this case, the same control voltage is inputted to each of the buffer cells forming the buffer delay line unit 720.

The phase offset detection unit 730 receives a plurality of the first impulse positioning signals P1 inputted to the buffer delay line unit 720 and delayed by a predetermined amount of time at each of the buffer cells, and the second impulse positioning signal P2 and outputs a value of a digitized phase difference of the two impulse positioning signals, to the azimuth calculator 330. In this case, since the variance of the delay time of the first impulse positioning signal P1 is controlled by the phase delay time control unit 710, the error occurring due to the buffer cells forming the buffer delay line unit 720 may be reduced. Accordingly, an error of the phase difference between the two detected impulse positioning signals is reduced, thereby improving reliability.

In this case, the phase offset detection unit 730 includes a plurality of AND gate circuits, and the second impulse positioning signal P2 is inputted to each of the AND gate circuits via an inverter.

Figure 8:
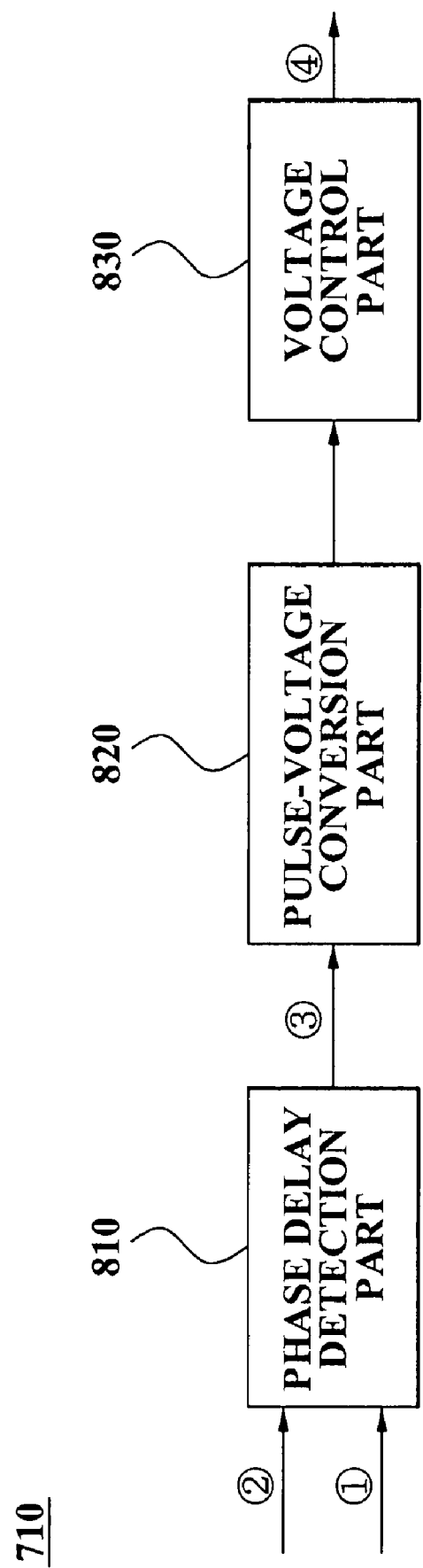
FIG. 8 is a block diagram illustrating a configuration of a phase delay time control unit shown in FIG. 7.

FIG. 8 is a block diagram illustrating a configuration of the phase delay time control unit 710 shown in FIG. 7. Referring to FIG. 8, the phase delay time control unit 710 includes a phase delay detection pail 810, a pulse-voltage conversion part 820, and a voltage control part 830.

The phase delay detection part 810 receives a reference signal ① and a signal ② made from the reference signal ① passing through the buffer delay line unit 720 and outputs a pulse signal ③ of a phase difference between the two signals.

The pulse-voltage conversion part 820 converts the pulse signal of the phase difference between the reference signal ① and the signal ②, into a voltage signal that determines a magnitude of a control voltage ④ for controlling the delay time of the buffer cells.

The voltage control part 830 identically inputs the control voltage ④ controlling the delay time of the buffer cells forming the buffer delay line unit 720 based on the voltage signal ④ converted at the pulse-voltage conversion part 820, to all of the buffer cells.

The operations of the phase difference detector 320 having the configurations shown FIGS. 7 and 8 will be described in detail by referring to FIGS. 9 and 10.

Figure 9:
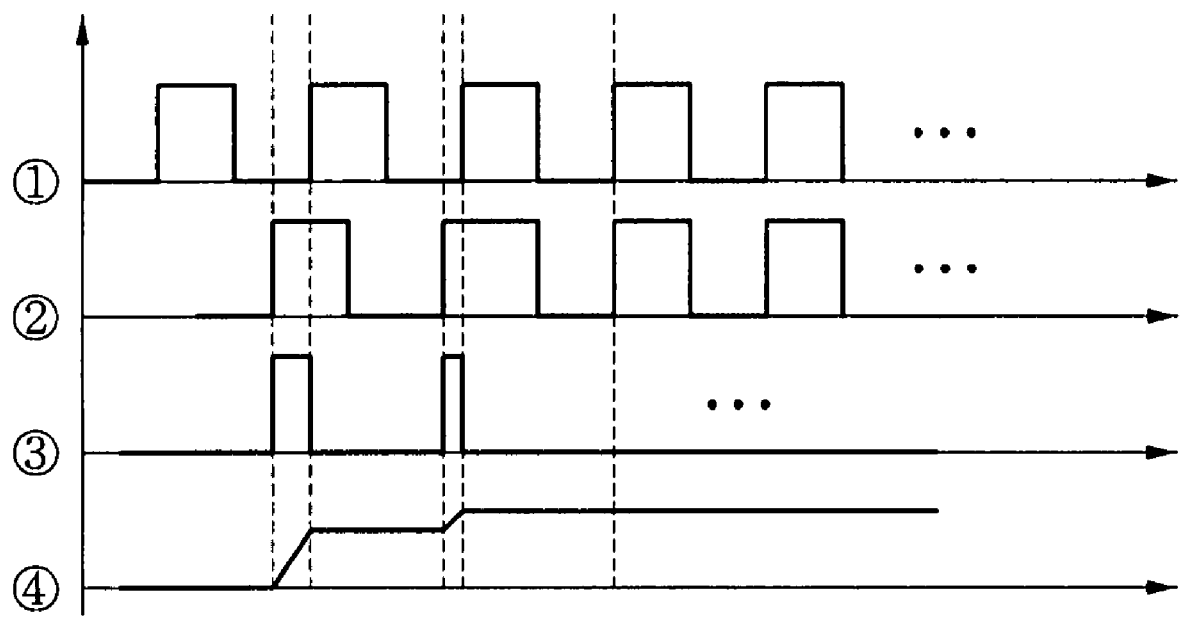
FIG. 9 is a diagram illustrating a waveform of each of signals ① through ④ shown in FIG. 8.

FIG. 9 is a diagram illustrating a waveform of each of the signals ① through ④ shown in FIG. 8. Referring to FIG. 9, the phase delay detection part 810 outputs the pulse signal ③ of the phase difference of the reference signal ① and the signal ② made from the reference signal ① passing through the buffer delay line unit 720.

The pulse-voltage conversion part 820 converts the pulse signal ③ of the phase difference, into the voltage signal. The voltage control part 830 inputs the determined control voltage ④ to all of the buffer cells of the buffer delay line unit 720, based on the converted voltage signal.

As shown in FIG. 9, when a process of controlling the delay time of the buffer cells by the voltage control part 830 is repeated, the phase difference between the reference signal ① and the signal ② is reduced, thereby controlling the variance due to the buffer cells forming the buffer delay line unit 720.

When the variance with respect to the buffer delay line unit 720 is controlled, the phase offset detection unit 730 receives the first impulse positioning signal P1 passing through the buffer delay line unit 720 and the second impulse positioning signal P2, detects the phase difference between the first impulse positioning signal P1 and the second impulse positioning signal P2, and outputs a result of the phase difference as a digital value.

Figure 10:
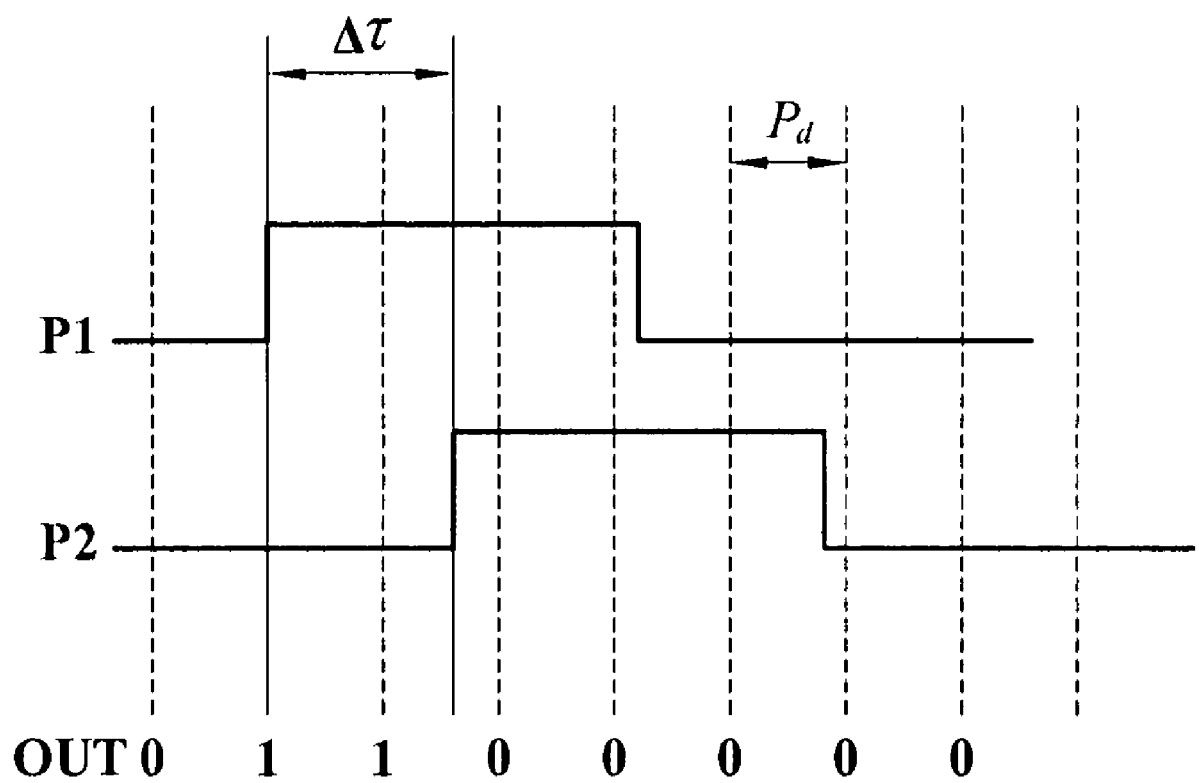
FIG. 10 is a diagram illustrating waveforms and output result values of two impulse positioning signals inputted in FIG. 8.

FIG. 10 is a diagram illustrating waveforms of the first impulse positioning signal P1 and the second impulse positioning signal P2, according to an exemplary embodiment of the present invention. FIG. 10 illustrates a phase difference $\Delta\tau$ and a digital value corresponding to the phase difference $\Delta\tau$. In this case, $P_d$ indicates propagation delay time of a buffer.

Specifically, since the variance with respect to the buffer delay line unit 720 is previously controlled, a phase delay variance of the first impulse positioning signal passing through the buffer delay line unit 720 does not occur and the phase offset detection unit 730 may precisely detect the phase difference between the first impulse positioning signal and the second impulse positioning signal. Accordingly, the object 230 may precisely measure the position of the object 230 by using the detected phase difference via Equations 1 and 2.

Figure 11:
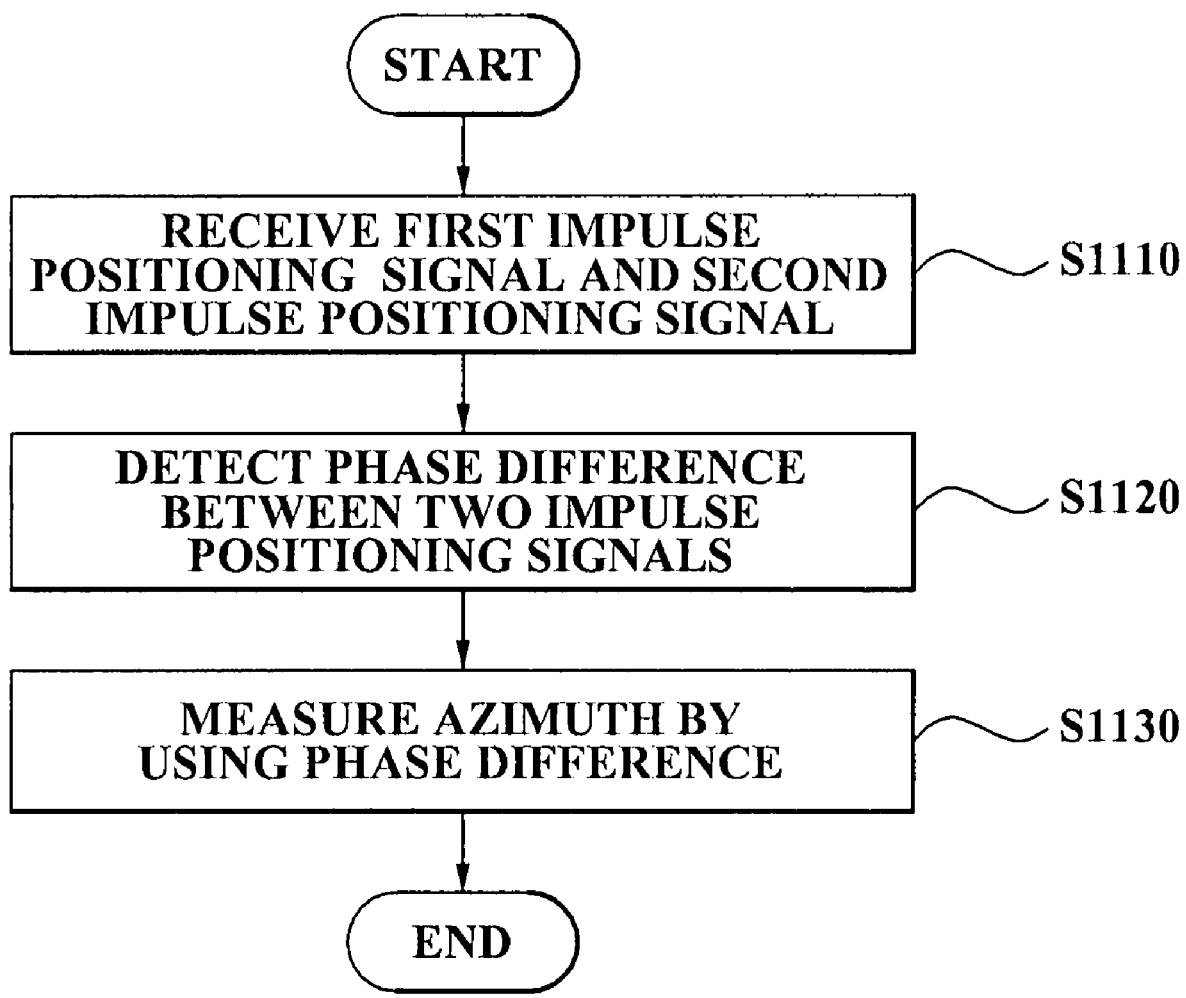
FIG. 11 is a flowchart illustrating a method of measuring an azimuth by using a phase difference according to an exemplary embodiment of the present invention.

FIG. 11 is a flowchart illustrating a method of measuring an azimuth by using a phase difference according to an exemplary embodiment of the present invention. Referring to FIG. 11, a first impulse positioning signal and a second impulse positioning signal are received in operation S1110, a phase difference between the two impulse positioning signals is detected in operation S1120, and an azimuth is measured by using the phase difference in operation S1130.

In this case, the first impulse positioning signal and the second impulse positioning signal are received from a first fixed position and a second fixed position such as the first and second positions 210 and 220 of FIG. 2, respectively.

In this case, operation S1120 of detecting a phase difference may include operations of detecting the phase difference and digitizing the detected phase difference. Specifically, the digital value of the phase difference, capable of being used when measuring the azimuth, may be included in operation S1120 of detecting a phase difference.

In this case, measuring the azimuth by using the phase difference may be performed via Equations 1 and 2.

Next, a process of detecting the phase difference between the two impulse positioning signals will be described in detail.

Figure 12:
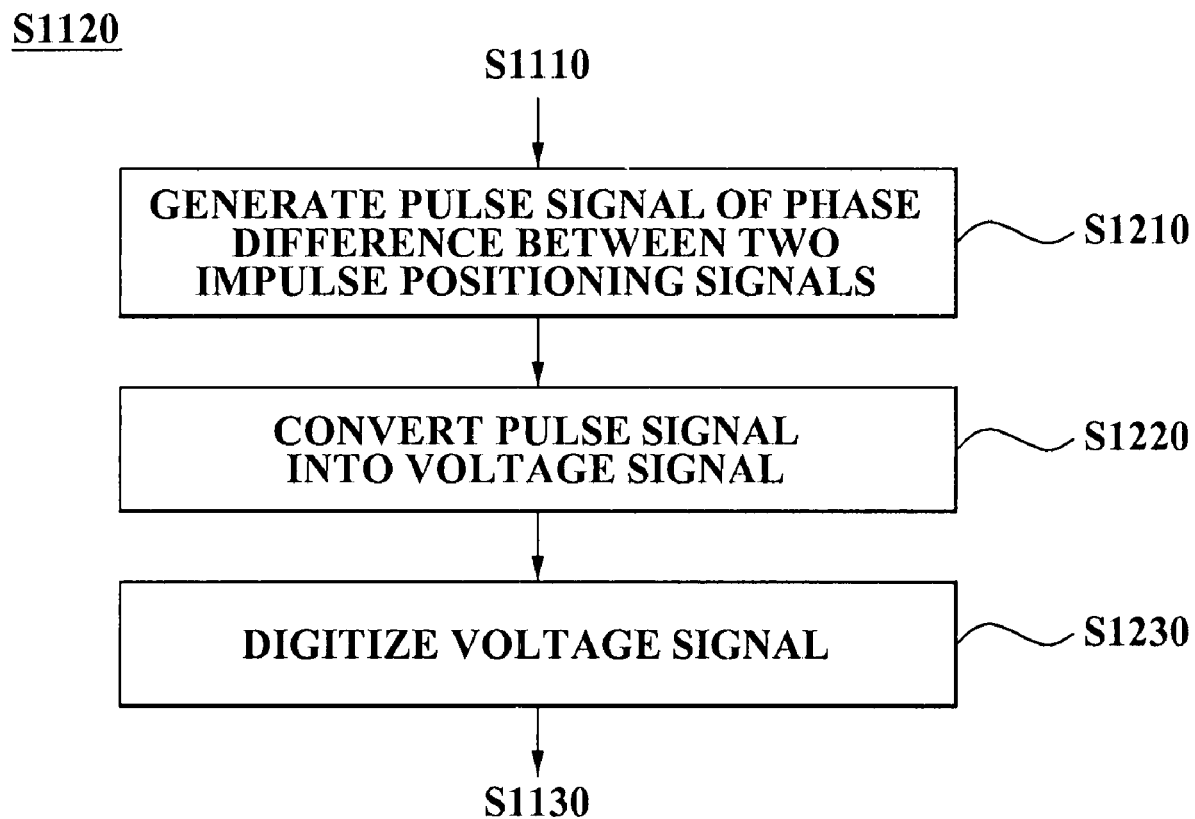
FIG. 12 is a flowchart illustrating in detail operation S1120 shown in FIG. 11.

FIG. 12 is a flowchart illustrating in detail operation S1120 shown in FIG. 11, according to an exemplary embodiment of the present invention. Referring to FIG. 12, operation S1120 of detecting a phase difference includes operation S1210 of generating a pulse signal of the phase difference between the two impulse positioning signals, operation S1220 of converting the pulse signal into a voltage signal, and operation S1230 of digitizing the voltage signal.

The operations shown in FIG. 12 are identical with the operations of the phase difference detector 320, shown in FIGS. 4 and 5. Namely, the phase difference between the two inputted impulse positioning signals is detected by using a device such as a phase detector in operation S1210, the pulse signal of the detected phase difference is converted to the voltage signal for conversion into a digital value in operation S1220, and the voltage signal is converted into the digital value in operation S1230, thereby measuring the azimuth.

Figure 13:
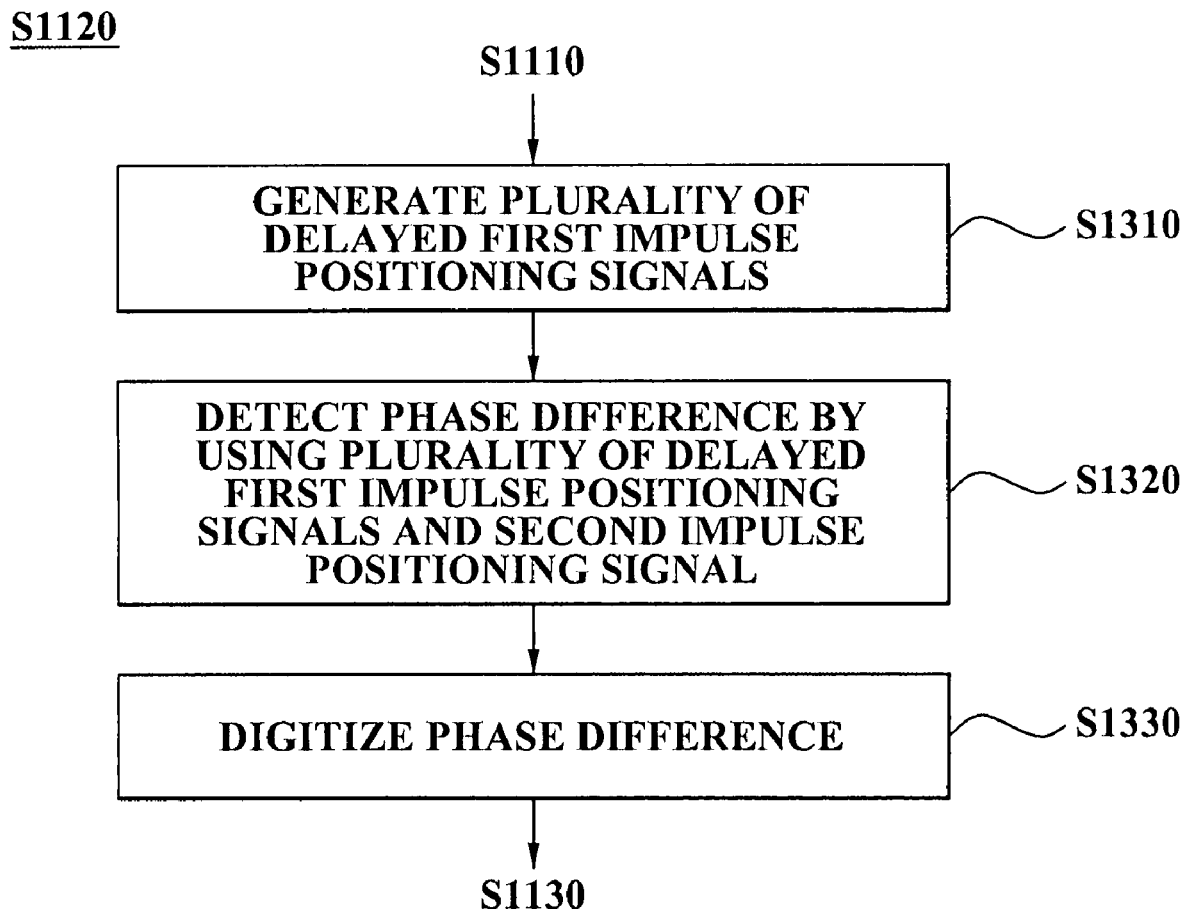
FIG. 13 is a flowchart illustrating in detail operation S1120 shown in FIG. 11, according to another exemplary embodiment of the present invention.

FIG. 13 is a flowchart illustrating in detail operation S1120 shown in FIG. 11, according to another exemplary embodiment of the present invention. Referring to FIG. 13, operation S1120 of detecting a phase difference includes operation S1310 of generating a plurality of delayed first impulse positioning signals, operation S1320 of detecting a phase difference between the two impulse positioning signals by using the signals generated in operation S1310 and a second impulse positioning signal, and operation S1330 of digitizing the detected phase difference. In this case, the signal generated in operation S1310 may be generated at a buffer delay line.

The operations shown in FIG. 13 are identical with the operations of the phase difference detector 320 shown in FIG. 6. Namely, the plurality of delayed signals of the first impulse positioning signal is outputted by the buffer delay line in operation S1310, the phase difference between the two impulse positioning signals received from the first position and the second position is detected by using the plurality of the delayed first impulse positioning signals and the second impulse positioning signal in operation S1320, and the phase difference of the two detected impulse positioning signals is digitized for output in operation S1330.

Figure 14:
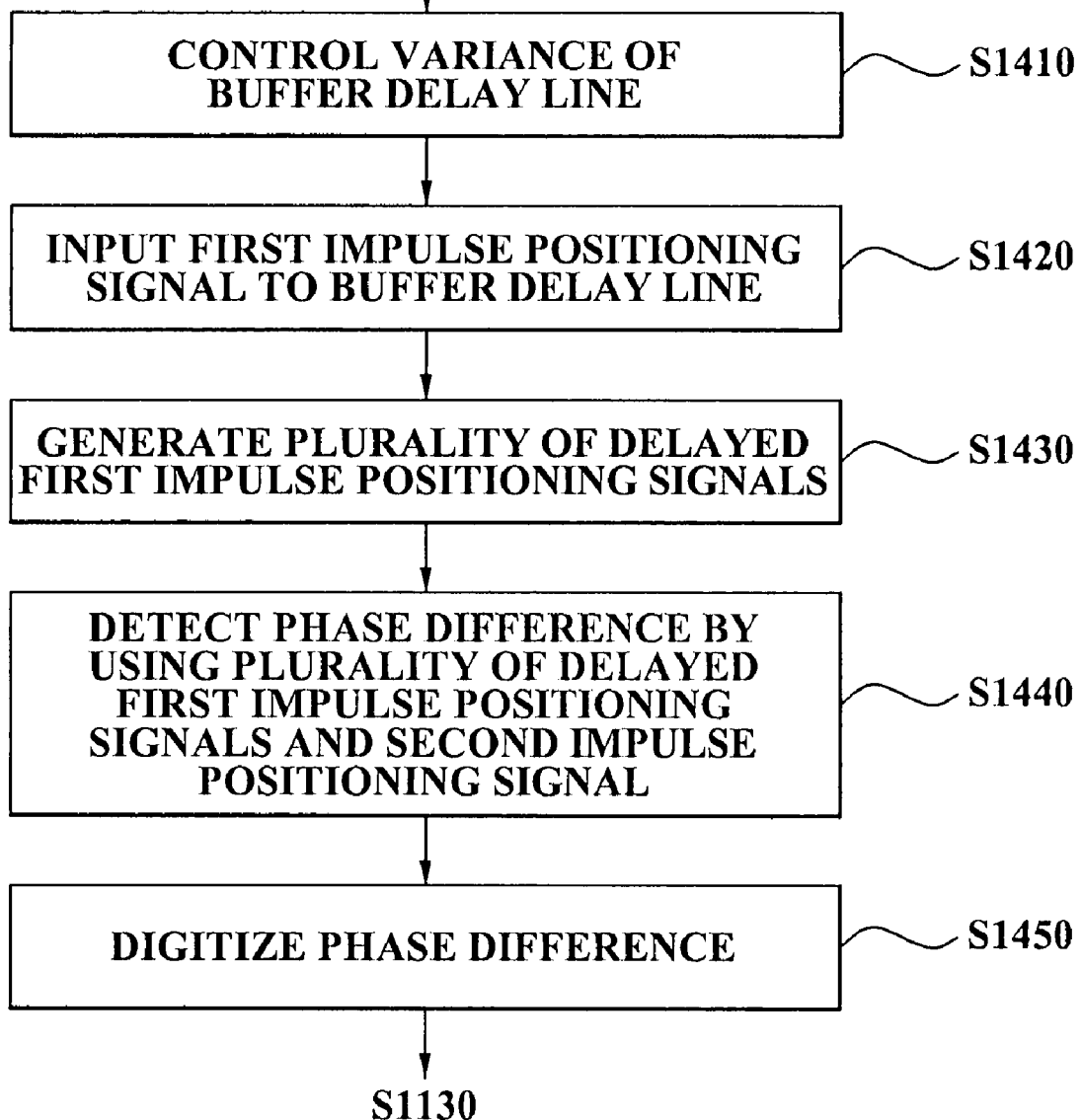
FIG. 14 is a flowchart illustrating in detail operation S1120 shown in FIG. 11, according to still another exemplary embodiment of the present invention.

FIG. 14 is a flowchart illustrating in detail operation S1120 shown in FIG. 11, according to still another exemplary embodiment of the present invention. Referring to FIG. 14, operation S1120 of detecting a phase difference includes operation S1410 of controlling a variance of the buffer delay line, operation S1420 of inputting the first impulse positioning signal to the buffer delay line whose variance is controlled, operation S1430 of generating a plurality of delayed first impulse positioning signals, operation S1440 of detecting a phase difference by using the signals generated in operation S1430 and the second impulse positioning signal, and operation S1450 of digitizing the detected phase difference.

Namely, comparing FIG. 14 and FIG. 13, operation S1410 of controlling the variance of the buffer delay line is further included in FIG. 14. Accordingly, operation S1410 will be described in detail.

FIG. 15 is a flowchart illustrating in detail operation S1410 shown in FIG. 14. Referring to FIG. 15, operation S1410 of controlling a variance of the buffer delay line includes operation S1510 of inputting a reference signal to the buffer delay line, operation S1520 of generating a pulse signal of a phase difference between the reference signal and a signal made from the reference signal passing through the buffer delay line, operation S1530 of converting the pulse signal into a voltage signal, and operation S1540 of controlling a delay time of buffer cells forming the buffer delay line, based on the voltage signal. In this case, the buffer delay line delays the reference signal by half-period multiples of a period T, i.e. T/2, T, 3T/2, . . . of the reference signal.

The operations shown in FIG. 15 are identical with the operations of the phase delay time control unit 710 shown in FIGS. 8 and 9. Namely, the reference signal and the signal made from the reference signal passing through the buffer delay line are inputted in operation S1510, the phase difference between the two signals is generated as the pulse signal in operation S1520, the pulse signal of the phase difference is converted into the voltage signal in operation S1530, and the delay time of the buffer cells forming the buffer delay line is controlled based on the voltage signal in operation S1540. In this case, the delay time of the buffer cells varies with a magnitude of a control voltage inputted to the buffer cells.

Via the series of the above-described processes, the variance of the buffer delay line is controlled and the phase difference between the first impulse positioning signal and the second impulse positioning signal may be precisely measured by using the buffer delay line whose variance is controlled.

The azimuth measurement method using a phase difference, according to the present invention, may be embodied as a program instruction capable of being executed via various computer units and may be recorded in a computer-readable recording medium. The computer-readable medium may include a program instruction, a data file, and a data structure, separately or cooperatively. The program instructions and the media may be those specially designed and constructed for the purposes of the present invention, or they may be of the kind well-known and available to those skilled in the art of computer software arts. Examples of the computer-readable media include magnetic media (e.g., hard disks, floppy disks, and magnetic tapes), optical media (e.g., CD-ROMs or DVD), magneto-optical media (e.g., optical disks), and hardware devices (e.g., ROMs, RAMs, or flash memories, etc.) that are specially configured to store and perform program instructions. The media may also be transmission media such as optical or metallic lines, wave guides, etc. including a carrier wave transmitting signals specifying the program instructions, data structures, etc. Examples of the program instructions include both machine code, such as produced by a compiler, and files containing high-level language codes that may be executed by the computer using an interpreter. The hardware elements above may be configured to act as one or more software modules for implementing the operations of this invention.

An aspect of the present invention provides an azimuth measurement apparatus and method using a phase difference, capable of precisely detecting a position of an object by measuring an azimuth of the object by using a phase difference of two impulse positioning signals.

An aspect of the present invention also provides an azimuth measurement apparatus and method using a phase difference, in which an object may quickly move to a desired position because a position of the object may be precisely detected by using a phase difference. For example, when the object is a robot vacuum cleaner, since a present position may be precisely known, the robot vacuum cleaner may quickly move to other positions to vacuum.

An aspect of the present invention provides an azimuth measurement apparatus and method using a phase difference, capable of reducing an error of the phase difference between two impulse positioning signals, occurring due to a variance of a buffer delay line, and precisely detecting the phase difference by controlling the variance of the buffer delay line.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An azimuth measurement apparatus comprising:
   a positioning signal receiver which receives a first impulse positioning signal and a second impulse positioning signal from a first fixed position and a second fixed position, respectively;
   a phase difference detector which detects a phase difference between the first impulse positioning signal and the second impulse positioning signal; and
   an azimuth calculator which measures an azimuth between a reference plane and an object of positioning, based on the first impulse positioning signal, the second impulse positioning signal, and the detected phase difference,
   wherein the phase difference detector comprises:
   a positioning signal phase detection unit which receives the first impulse positioning signal and the second impulse positioning signal and outputs a pulse signal with respect to the phase difference of the two positioning signals;
   a pulse-voltage conversion unit which converts the pulse signal into a voltage signal; and
   an analogue-digital (A/D) conversion unit which digitizes and outputs the voltage signal to the azimuth calculator.

2. An azimuth measurement apparatus comprising:
   a positioning signal receiver which receives a first impulse positioning signal and a second impulse positioning signal from a first fixed position and a second fixed position, respectively;
   a phase difference detector which detects a phase difference between the first impulse positioning signal and the second impulse positioning signal; and
   an azimuth calculator which measures an azimuth between a reference plane and an object of positioning, based on the first impulse positioning signal, the second impulse positioning signal, and the detected phase difference, wherein the phase difference detector comprises:
a buffer delay line unit comprising a plurality of buffer cells, connected in series, which generates a delay signal of the first impulse positioning signal; and
a phase offset detection unit which detects, digitizes, and outputs the phase difference between the first impulse positioning signal and the second impulse positioning signal based on a plurality of the delay signals generated by the buffer delay line unit and the second impulse positioning signal, to the azimuth calculator.

3. The apparatus of claim 2, wherein the phase offset detection unit comprises a plurality of AND logic circuits to which the second impulse positioning signal is inputted though an inverter.

4. An azimuth measurement apparatus comprising:
a positioning signal receiver which receives a first impulse positioning signal and a second impulse positioning signal from a first fixed position and a second fixed position, respectively;
a phase difference detector which detects a phase difference between the first impulse positioning signal and the second impulse positioning signal; and
an azimuth calculator which measures an azimuth between a reference plane and an object of positioning, based on the first impulse positioning signal, the second impulse positioning signal, and the detected phase difference,
wherein the phase difference detector comprises:
a buffer delay line unit comprising a plurality of buffer cells whose delay time is controlled by a magnitude of a control voltage;
a phase delay time control unit which determines the magnitude of the control voltage based on a reference signal and an input of the reference signal, passing through the buffer delay line unit; and
a phase offset detection unit which detects, digitizes, and outputs the phase difference between the first impulse positioning signal and the second impulse positioning signal based on an output of each buffer cell forming the buffer delay line unit with respect to the first impulse positioning signal and the second impulse positioning signal, to the azimuth calculator.

5. The apparatus of claim 4, wherein the buffer delay line unit delays the reference signal by half-period multiples of the reference signal.

6. The apparatus of claim 4, wherein the phase delay time control unit comprises:
a phase delay detection part which receives the reference signal, passes the reference signal through the buffer delay line unit, and outputs a pulse signal with respect to a phase difference between the two signals;
a pulse-voltage conversion part which converts the pulse signal into a voltage signal; and
a voltage control part which determines a magnitude of the control voltage based on the voltage signal.

7. The apparatus of claim 6, wherein the voltage control part controls a delay time of all of the plurality of buffer cells by identically inputting the determined control voltage to all of the buffer cells included in the buffer delay line unit.

8. The apparatus of claim 4, wherein the phase offset detection unit comprises a plurality of AND logic circuits to which the second impulse positioning signal is inputted through an inverter.

9. An azimuth measurement method comprising:
receiving a first impulse positioning signal and a second impulse positioning signal from a first fixed position and a second fixed position, respectively;
detecting a phase difference between the first impulse positioning signal and the second impulse positioning signal; and
measuring an azimuth between a reference plane and an object of positioning, based on the first impulse positioning signal, the second impulse positioning signal, and the detected phase differences,
wherein the detecting the phase difference comprises:
receiving the first impulse positioning signal and the second impulse positioning signal and outputting a pulse signal with respect to the phase difference of the two positioning signals;
converting the pulse signal into a voltage signal; and
digitizing the voltage signal.

10. An azimuth measurement method comprising:
receiving a first impulse positioning signal and a second impulse positioning signal from a first fixed position and a second fixed position, respectively;
detecting a phase difference between the first impulse positioning signal and the second impulse positioning signal; and
measuring an azimuth between a reference plane and an object of positioning, based on the first impulse positioning signal, the second impulse positioning signal, and the detected phase difference,
wherein the detecting the phase difference comprises:
generating a plurality of delay signals of the first impulse positioning signal;
detecting the phase difference between the first impulse positioning signal and the second impulse positioning signal based on the plurality of delay signals of the first impulse positioning signal and the second impulse positioning signal; and
digitizing the detected phase difference.

11. An azimuth measurement method comprising:
receiving a first impulse positioning signal and a second impulse positioning signal from a first fixed position and a second fixed position, respectively;
detecting a phase difference between the first impulse positioning signal and the second impulse positioning signal; and
measuring an azimuth between a reference plane and an object of positioning, based on the first impulse positioning signal, the second impulse positioning signal, and the detected phase difference,
wherein the detecting the phase difference comprises:
controlling a variance of the buffer delay line formed of the plurality of buffer cells;
inputting the first impulse positioning signal to the buffer delay line whose variance is controlled; and
detecting a phase difference between an output of each buffer cell of the buffer delay line with respect to the first impulse positioning signal and the second impulse positioning signal based on the two signals.

12. The method of claim 11, wherein the controlling the variance of the buffer delay line comprises:
inputting a predetermined reference signal to the buffer delay line;
outputting a pulse signal with respect to a phase difference between a signal generated from the reference signal via the buffer delay line and the predetermined reference signal;
converting the pulse signal into a voltage signal; and controlling a delay time of the buffer cells forming the buffer delay line based on the voltage signal.

13. The method of claim 12, wherein, in the controlling the variance of the buffer delay line, the variance of the buffer delay line is controlled until there is no phase difference between the signal outputted via the buffer delay line and the predetermined reference signal.

14. The method of claim 13, wherein, in the controlling the variance of the buffer delay line, the reference signal is delayed in half-period multiples of the reference signal.

15. A computer-readable recording medium having stored thereon instructions for enabling a computer to execute operations of performing an azimuth measurement method, the operations comprising:
receiving a first impulse positioning signal and a second impulse positioning signal from a first fixed position and a second fixed position, respectively;
detecting a phase difference between the first impulse positioning signal and the second impulse positioning signal; and
measuring an azimuth between a reference plane and an object of positioning, based on the first impulse positioning signal, the second impulse positioning signal, and the detected phase differences,
wherein the detecting the phase difference comprises:
receiving the first impulse positioning signal and the second impulse positioning signal and outputting a pulse signal with respect to the phase difference of the two positioning signals;
converting the pulse signal into a voltage signal; and
digitizing the voltage signal.

16. A computer-readable recording medium having stored thereon instructions for enabling a computer to execute operations of performing an azimuth measurement method, the operations comprising:
receiving a first impulse positioning signal and a second impulse positioning signal from a first fixed position and a second fixed position, respectively;
detecting a phase difference between the first impulse positioning signal and the second impulse positioning signal; and
measuring an azimuth between a reference plane and an object of positioning, based on the first impulse positioning signal, the second impulse positioning signal, and the detected phase difference,
wherein the detecting the phase difference comprises:
generating a plurality of delay signals of the first impulse positioning signal;
detecting the phase difference between the first impulse positioning signal and the second impulse positioning signal based on the plurality of delay signals of the first impulse positioning signal and the second impulse positioning signal; and
digitizing the detected phase difference.

17. A computer-readable recording medium having stored thereon instructions for enabling a computer to execute operations of performing an azimuth measurement method, the operations comprising:
receiving a first impulse positioning signal and a second impulse positioning signal from a first fixed position and a second fixed position, respectively;
detecting a phase difference between the first impulse positioning signal and the second impulse positioning signal; and
measuring an azimuth between a reference plane and an object of positioning, based on the first impulse positioning signal, the second impulse positioning signal, and the detected phase difference,
wherein the detecting the phase difference comprises:
controlling a variance of the buffer delay line formed of the plurality of buffer cells;
inputting the first impulse positioning signal to the buffer delay line whose variance is controlled; and
detecting a phase difference between an output of each buffer cell of the buffer delay line with respect to the first impulse positioning signal and the second impulse positioning signal based on the two signals.

18. An azimuth measurement apparatus comprising:
a receiver which receives a first signal and a second signal from a first position and a second position, respectively;
a phase detector which detects a phase difference between the first signal and the second signal; and
an azimuth calculator which determines an azimuth between a reference plane and an object, based on the first signal, the second signal, and the detected phase difference,
wherein the phase detector comprises:
a phase detection unit which receives the first signal and the second signal and outputs a pulse signal based on the phase difference between the first signal and the second signal;
a conversion unit which converts the pulse signal into a voltage signal.

19. An azimuth measurement method comprising:
receiving a first signal and a second signal from a first position and a second position, respectively;
detecting a phase difference between the first signal and the second signal; and
measuring an azimuth between a reference plane and an object, based on the first signal, the second signal, and the detected phase difference,
wherein the detecting the phase difference comprises:
receiving the first signal and the second signal and outputting a pulse signal based on the phase difference between the first signal and the second signal; and
converting the pulse signal into a voltage signal.

20. A computer-readable recording medium having stored thereon instructions for enabling a computer to execute operations of performing an azimuth measurement method, the operations comprising:
receiving a first signal and a second signal from a first position and a second position, respectively;
detecting a phase difference between the first signal and the second signal; and
measuring an azimuth between a reference plane and an object, based on the first signal, the second signal, and the detected phase difference,
wherein the detecting the phase difference comprises:
receiving the first signal and the second signal and outputting a pulse signal based on the phase difference between the first signal and the second signal; and
converting the pulse signal into a voltage signal.

* * * * *